3,004,029
NEW BENZANTHRONE ANTHRAQUINONE
ACRIDINE VAT DYES
William Baptist Hardy, Bound Brook, and Isaiah Von, Somerville, N.J., assignors to American Cyanamid Company, New York, N.Y., a corporation of Maine
No Drawing. Filed Dec. 19, 1957, Ser. No. 703,987
3 Claims. (Cl. 260—274)

This invention relates to new vat dyestuffs obtained by caustic alkali fusion of compounds of the formula:

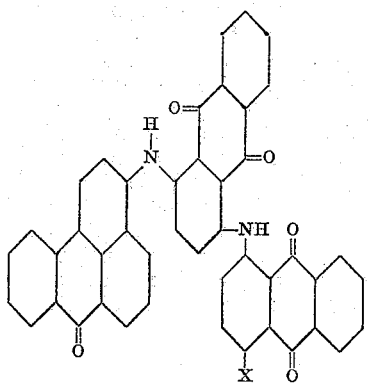

in which X is a halogen having an atomic number greater than 9 and not greater than 35.

Dyestuffs for the dyeing of military uniforms present a serious problem. The enormous increase in fire power in modern warfare makes it imperative for soldiers to blend into the terrain so that they are either unobserved or present relatively poor targets. The art of camouflage resulted in the development of uniforms having colors which blend into the average landscape. During the Second World War, observation by means infrared radiation completely changed the problem of camouflage because, while dyes of excellent fastness and dull drab shades under visible light were generally used for the dyeing of uniforms, all of the fast dyes with otherwise desirable properties showed high reflectance in the infrared and, therefore, soldiers wearing uniforms dyed with these dyes when observed under infrared radiation, for example by means of devices such as snooperscopes and sniperscopes, stood out against average terrain, making discovery easy and presenting excellent targets.

Extensive investigations have shown that to be effective under infrared observation, dyed fabrics must show an infrared reflectance which is relatively low, preferably below 25%, but which of course should not be too low. In other words, in average terrain a soldier to be effectively concealed or to present a poor target should appear no lighter than the background and while it is undesirable that a soldier should appear much darker, any difference in infrared reflectance from that of the terrain should be on the darker rather than on the lighter side.

There are known some dyes, for examples some sulfur dyes, which exhibit low infrared reflectance. These dyes, however, have such inferior fastness to light and to the rather drastic washing conditions in the field that they are not practical. On the other hand, vat dyes which show satisfactory light and wash fastness have in the past also shown high infrared reflectance. The need for vat dyes of low infrared reflectance and satisfactory fastness properties has therefore been unfulfilled, both for use as the only dyes for uniforms and for use in blends with small amounts of other dyes of higher infrared reflectance.

The dyestuffs of the present invention are characterized by high light absorption in the infrared, making them very satisfactory for use in the dyeing of military uniforms and similar military goods. They also have satisfactory fastness properties.

The alkali fusion of the trianthrimides shown above undoubtedly results in ring closure to form a benzanthrone anthraquinone acridine ring. The halogen comes out and is replaced by a substituent, the nature of which has not as yet been definitely determined. It is therefore not intended to limit the invention to a particular formula. However, probably the formula of the dyestuff resulting may be represented as follows:

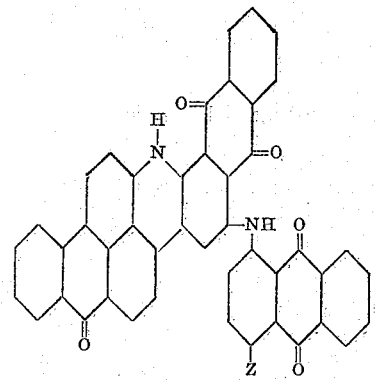

where Z is the unknown substituent replacing the halogen.

The trianthrimide referred to above is obtained by condensing a Bz-1-halogen benzanthrone with a 1-amino-4-chloro- or -4-bromoanthraquinone. Surprisingly, this reaction instead of giving a dianthrimide which would be expected gives a compound which is predominantly the trianthrimide represented above. Analysis shows that the compound is not perfectly pure and contains smaller amounts of other compounds which appear to be the dianthrimide and possibly traces of higher condensation products. Elementary analysis, however, shows that the compound predominantly is the trianthrimide.

The fusion of the trianthrimide produces a compound having very much better infrared reflectance properties than when the unhalogenated compound is fused. As has been stated above, the halogen is removed but it is evidently substituted by some other group as there is no other way to explain the markedly superior infrared reflectance properties of the dyes of the present invention.

The alkali fusion is effected under more or less standard conditions for alkali fusions of halogenated benzanthrone compounds; that is to say, the fusion is with caustic alkali, and advantageously with caustic potash, and an alcohol to render the melt sufficiently fluid for adequate stirring. Although the conditions fall within the ranges frequently used for alkali fusions, they are subject to very definite limitations, without which a useful and practical process and product of superior properties are not obtained. This is not to say that no reaction takes place outside the definite limitations which will be set out below, but it is not a practically useful process and in many cases does not produce a compound having the desirable properties of the present invention.

The temperature of the actual melt must be maintained between 125° and 185° C. Optimum results are obtained between 130° and 160° C., and this narrower range therefore constitutes a preferred embodiment. The amount of caustic alkali is also sharply limited, although the range usable is sufficiently broad so that the process can be easily carried out on a commercial scale with ordinary operators. The amount of caustic alkali based on the benzanthrone dianthrimide subjected to fusion should not be less than 3 parts by weight nor more than 30. It is preferred to operate within the range of 5–15 parts. Time of reaction is not specifiable in exact numbers because, as is normal with organic chemical reactions, the time required is shorter at higher temperatures than at lower temperatures. However, there is a very rigid time limit which is determined by sample analysis. The time should continue until the halogen combined with the benzanthrone anthrimide has been reduced to not over 0.1%. In practical operation the time will be a little longer in order to provide a margin of safety. Considerably longer times may be used but beyond the point where a reasonable practical margin of safety is exceeded, no benefit is obtained, and, of course, there is a practical limit as the fusion, if carried on for days or weeks, will gradually result in decomposition of some of the material. The upper limit on time, therefore, is not sharp, not critical, and purely one of commercial practicability. The lower time limit as measured by combined halogen analysis is, however, critical.

It is an advantage of the invention that the alcohol used in the caustic fusion is in no sense critical. Methanol and ethanol, which are the most common alcohols for use in such fusions, work well but other alcohols such as propanols, isobutanol and the like, may be used with equally satisfactory results. The use of caustic potash is preferred, although sodium hydroxide can be employed. However, in spite of the lower price of sodium hydroxide, the smoother fusion and more rapid and complete reaction makes potassium hydroxide worth its extra cost.

The amount of alcohol used is not critical and ordinarily is determined by the reaction itself; that is to say the alcohol will boil off to an equilibrium determined by the temperature, longer temperatures resulting in a melt that is effected in the presence of a larger amount of alcohol. This operation is substantially automatic, and, therefore, the amount of alcohol actually added is not of major significance so long as there is enough alcohol to form the equilibrium mixture. It should be pointed out, however, that the alcohol is not essential, as the fusion can be carried out with no alcohol present. However, the alcohol results in a more easily stirrable melt and so is preferable. The presence or absence of alcohol does not appear to change the reaction in any way so long as the agitation, which is vitally essential, is maintained. In other words, if there is continuous and thorough agitation, the results are quite satisfactory without any alcohol at all. The greater viscosity of the melt, however, in such cases requires more expensive and more elaborate agitating means.

The invention will be illustrated more fully in conjunction with the following specific examples, in which the parts are by weight unless otherwise specified. The formulae given for the final dyestuffs are of course only probable formulae since the nature of the unknown substituent has not as yet been determined.

*Example 1*

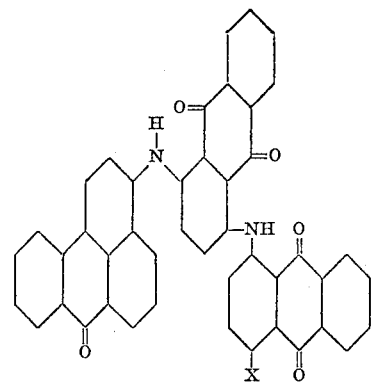

X=chlorine or bromine.

A mixture of 62 parts of Bz-1-bromobenzanthrone, 52 parts of 1-amino-4-chloroanthraquinone, 500 parts of naphthalene, 11 parts of copper powder, and 45 parts of soda ash is stirred at 140–145° C. until the reaction is substantially complete. The mixture is then diluted with 1,000 parts of dichlorobenzene, cooled to 100° C. and filtered hot. The cake is washed with dichlorobenzene and freed of inorganic salts by digestion in dilute hydrochloric acid. The product is isolated by filtration and washing. The yield is good. If the molecular usage of bromobenzanthrone is doubled, the product is found to have approximately the same analysis as the above product, corresponding to 1(Bz-1-benzanthronylamino)-4-(4'-chloro-1'-anthraquinonylamino)anthraquinone.

*Example 2*

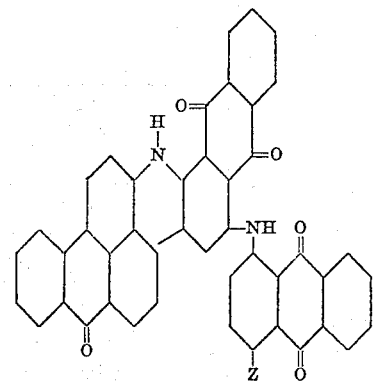

Z is an unknown substituent.

A mixture of 200 parts of methanol and 360 parts of caustic potash is fused and heated to 157° C. It is then cooled to 135° C. and 30 parts of the product of Example 1 are added. The reaction mass is stirred at 130–135° C. until the reaction is substantially complete. The mixture is then drowned in 5,000 parts of ice water and the drowned mixture is aerated until the product has precipitated. The latter is isolated by filtration and washing. It dyes cotton an olive-brown shade of good fastness and low infrared reflectance. The same dye is obtained if the corresponding bromo compound is used as the starting material.

This application is in part a continuation of our copending application Ser. No. 360,332, filed June 8, 1953, and now abandoned.

We claim:
1. The dyestuff obtained by the process which comprises condensing Bz-1-halogenbenzanthrone with 1-ami- ino-4-haloanthraquinone to form a dianthrimide having the following formula

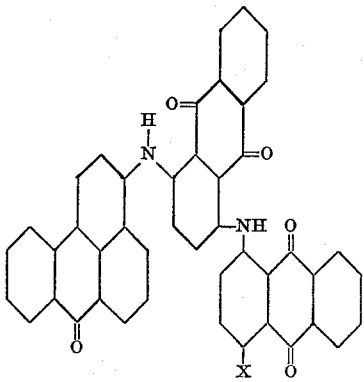

in which X is a halogen having an atomic number greater than 9 and not greater than 35, and subjecting the anthrimide to fusion with from 3–30 parts of caustic alkali per part of anthrimide at 125–185° C. until the combined halogen in the dyestuff has been reduced to not more than 0.1%.

2. The dyestuff obtained by the process which comprises condensing Bz-1-halogenbenzanthrone with 1-amino-4-chloroanthraquinone to form a dianthrimide having the following formula

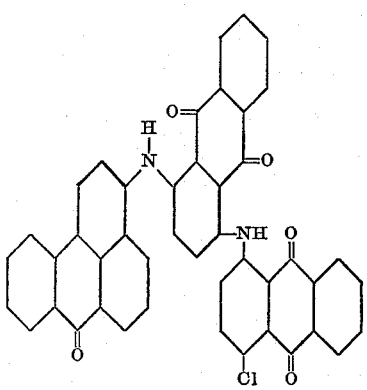

and subjecting the anthrimide to fusion with from 3–30 parts of caustic alkali per part of anthrimide at 125–185° C. until the combined halogen in the dyestuff has been reduced to not more than 0.1%.

3. The dyestuff according to claim 1 in which the haloanthraquinone is 1-amino-4-bromoanthraquinone.

References Cited in the file of this patent
UNITED STATES PATENTS

| | | |
|---|---|---|
| 1,936,716 | Honold | Nov. 28, 1933 |
| 2,505,234 | Deinet | Apr. 25, 1950 |